(12) United States Patent
Fares

(10) Patent No.: US 12,059,045 B1
(45) Date of Patent: Aug. 13, 2024

(54) SYSTEM FOR AND METHOD OF DIVERSION DEPLOYMENT OF A SURVIVAL SAW

(71) Applicant: Rodolph Hanna Fares, Beachwood, OH (US)

(72) Inventor: Rodolph Hanna Fares, Beachwood, OH (US)

(*) Notice: Subject to any disclaimer, the term of this patent is extended or adjusted under 35 U.S.C. 154(b) by 244 days.

(21) Appl. No.: 17/510,510

(22) Filed: Oct. 26, 2021

(51) Int. Cl.
*A41D 27/00* (2006.01)
*A41D 27/20* (2006.01)
*A62B 3/00* (2006.01)
*B23D 57/02* (2006.01)

(52) U.S. Cl.
CPC .............. *A41D 27/20* (2013.01); *A62B 3/00* (2013.01); *B23D 57/023* (2013.01)

(58) Field of Classification Search
None
See application file for complete search history.

(56) References Cited

U.S. PATENT DOCUMENTS

| 3,651,844 A * | 3/1972 | Barnes ................. B23D 61/185 30/502 |
| 2009/0031568 A1 * | 2/2009 | Yang .................... B23D 61/185 30/353 |
| 2018/0199641 A1 * | 7/2018 | Raso ................... A41D 13/0002 |

* cited by examiner

*Primary Examiner* — Hwei-Siu C Payer
(74) *Attorney, Agent, or Firm* — Gugliotta & Gugliotta LPA

(57) ABSTRACT

An article of clothing is provided in combination with a flexible saw and a deployment slot aligned with a seam within the article of clothing. The saw is storable in and retrievable from a cavity formed by the deployment slot. The article of clothing can be any military uniform or, preferably, an undergarment (i.e., undershirt; boxers/briefs, camisole or brassiere). The flexible saw has a elongated blade formed of a corrosive-resistant material and a grasping element formed at or attached to each end. The elongated blade may comprise a wire from about 20-gauge to about 26-gauge.

6 Claims, 6 Drawing Sheets

SYSTEM FOR AND METHOD OF DIVERSION DEPLOYMENT OF A SURVIVAL SAW

RELATED APPLICATIONS

There are no previously filed, nor currently any co-pending applications, anywhere in the world.

BACKGROUND OF THE INVENTION

1. Field of the Invention

The present invention relates generally to a survival saw and, more particularly, to a system and method for deploying and using a survival saw.

2. Description of the Related Art

Survival saws typically exist in a number of different forms, but usually with common elements: an elongated wire or cable blade element; and gripping elements attached to the ends thereof. The blade itself may be a wire or cable, with or without barbs or cutting protrusion, or a chain structure. By way of example, FIG. 1 shows a first version of a generally commercially available survival saw 10 in which an elongated cable 12 is wrapped with a helical wound wire 14 to function as a saw blade. A pair of handles 16 are provided, attached at each end of the cable 12, to allow for grasping. Alternately, FIG. 2 shows a second version of a generally commercially available survival saw 20 in which an elongated chain 22 formed of articulating chain elements 24 to function as a saw blade. A pair of handles 26 are provided, attached at each end of the chain 22, to allow for grasping.

Similar devices that are known that incorporate various mechanisms for providing a light weight, compact device well suited manual sawing in a reciprocating manner. For example:

U.S. Pat. No. 3,651,844 issued in the name of Banrnes discloses an all purpose saw having an elongated saw blade with a generally helical cutting tooth and gripping elements connected to each end thereof.

And, U.S. Patent Application Publication US 2009/0031568, published in the name of Yang, discloses a saw blade including an elongate and helical or flexible blade member having an outer peripheral cutting edge for allowing the blade member to be engaged into and engaged around a work piece without being maintained perpendicular to the work pieces and for allowing the blade member to be operated by the users. The blade member may include two elongated and planar blade elements superposed with each other and each having the cutting edge formed on the outer portion and extended out of an inner portion of the other blade elements for allowing the cutting edges of the blade elements to be exposed for easily working on or cutting the work pieces.

Survival, Evasion, Resistance, and Escape (SERE) is a training program, best known by its military acronym, that prepares U.S. military personnel, U.S. Department of Defense civilians, and private military contractors to survive and "return with honor" in survival scenarios. The curriculum includes survival skills, evading capture, application of the military code of conduct, and techniques for escape from captivity. Similar training exists for most organized militaries. While survival and evading techniques can be aided with the equipment that a soldier carries, once captured such equipment is likely unavailable and the "escape" component becomes problematic, and more specifically must usually be initiated as a prisoner, often stripped down to their underwear and physically restrained.

Consequently, tool and techniques that would aid such restrained prisoners in facilitating an escape would be beneficial, and it is preferable that deployment of any such tool would be best deployed using stealth and/or diversion.

SUMMARY OF THE INVENTION

It is thus objects of the present invention to provide a system and method of storing and deploying a survival saw.

It is features of the present invention to provide for diversionary storage and deployment of a survival saw.

Briefly described according to the present invention, an article of clothing is provided in combination with a flexible saw and a deployment slot aligned with a seam within the article of clothing. The saw is storable in and retrievable from a cavity formed by the deployment slot. The article of clothing can be any military uniform or, preferably, an undergarment (i.e., undershirt; boxers/briefs, camisole or brassiere). The flexible saw has a elongated blade formed of a corrosive-resistant material and a grasping element formed at or attached to each end. The elongated blade may comprise a wire from about 20-gauge to about 26-gauge.

It is an advantage of the present invention to allow for the stealth storage of a survival saw on a user in a manner likely to be easily overlooked.

Other advantages of the present invention allow for deployment of the survival saw, as well as its use, by a user who is restrained by handcuffs.

It is a further advantage of the present invention to allow for cutting plastics (zip ties), ropes, wood or even some kinds of light metals.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
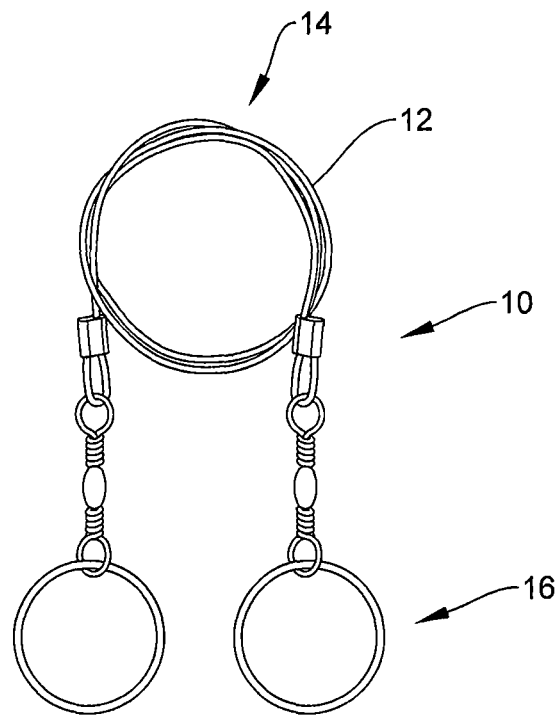
FIG. 1 depicts an exemplary cable type survival saw according to the PRIOR ART.
Figure 2:
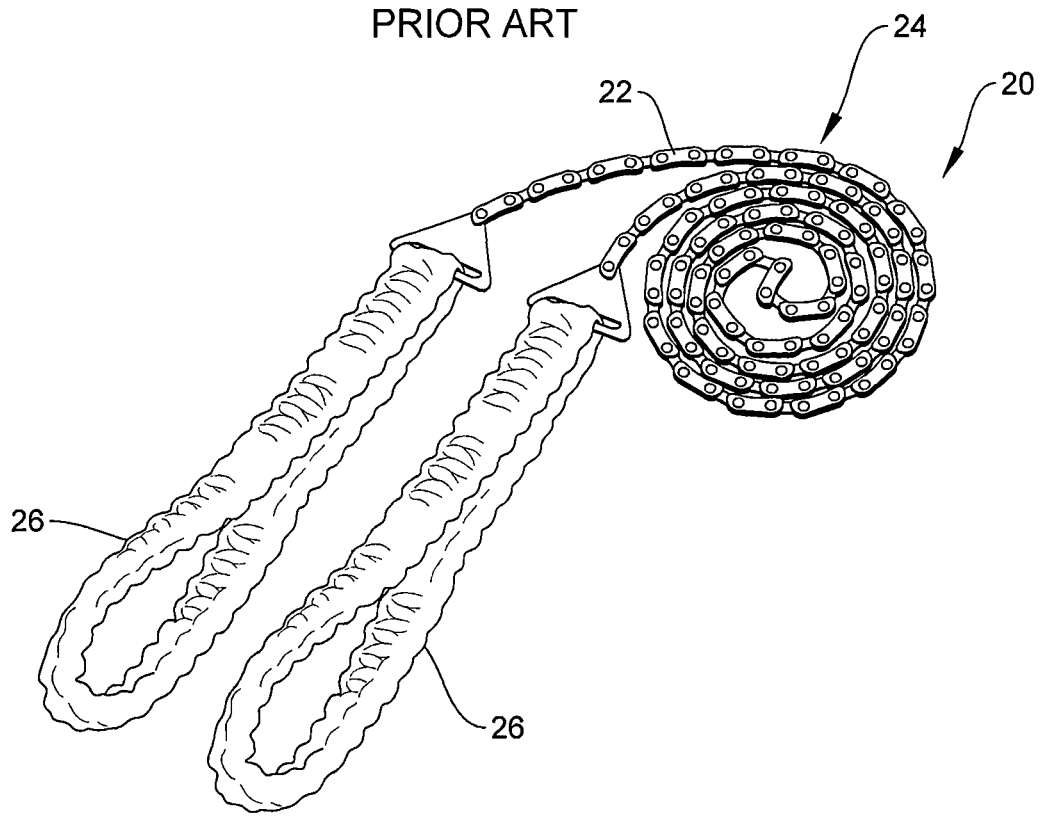
FIG. 2 depicts an exemplary chain type survival saw according to the PRIOR ART.

The best mode for carrying out the invention is presented in terms of its preferred embodiment, herein depicted within the Figures. It should be understood that the legal scope of the description is defined by the words of the claims set forth at the end of this patent application and that the detailed description is to be construed as exemplary only and does not describe every possible embodiment since describing every possible embodiment would be impractical, if not impossible. Numerous alternative embodiments could be implemented, using either current technology or technology developed after the filing date of this patent application, which would still fall within the scope of the claims.

For purposes of the present disclosure the terms "a" and "an" herein do not denote a limitation of quantity, but rather denote the presence of at least one (1) of the referenced items. Further for purposes of the present disclosure the terms "in", "out", "left" "right", "up" or "down" are all spacial and functionally relative directions used to aid in the description to best explain the principles of the invention and its practical application, and to aid others skilled in the art to best utilize the invention and are not meant to be limiting to any particular orientation. For further purposes of the present disclosure the terms "about" or "approximate" should be interpreted to indicate that absolute precision is not required, either in the structure or the measurement thereof, and as such should be broadly construed in a way that would be functionally equivalent as would be understood by a person having ordinary skill in the relevant art and in light of the present teachings. It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent application (other than the language of the claims). To the extent that any term recited in the claims at the end of this patent application is referred to in this patent application in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the FIGS. 3 through 11.

1. Detailed Description of the Figures

Referring now to the drawings, wherein like reference numerals indicate the same parts throughout the several views, a wire saw 100 is provided in combination with an element of clothing. The wire saw 100 is storable and retrievable within a deployment slot 102 that is aligned with a seam within the clothing in a manner that allows the deployment slot 102 to blend in with the clothing or uniform threading.

Figure 3A:
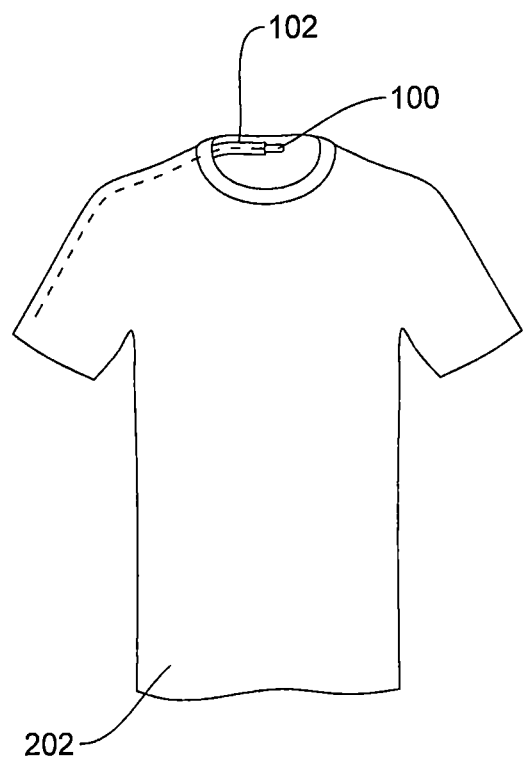
FIG. 3A is a front view of a shirt incorporating system for diversion deployment of a survival saw according to a preferred embodiment of the inventive system.
Figure 3B:
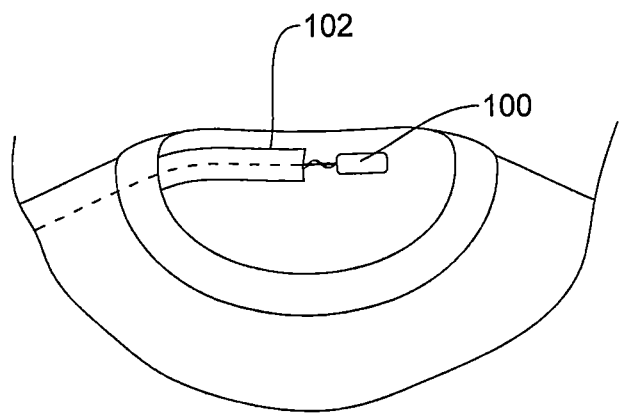
FIG. 3B is a partial detailed view of a deployment slot 102 formed within the seams of the shirt.

FIGS. 3A and 3B show a shirt 202 in combination with the wire saw 100. According to one aspect of the present invention the shirt 202 may incorporate the deployment slot 102. In a more preferred aspect of the present invention, the deployment slot 102 is aligned with a seam 204, thereby making the slot 102 an imperceptible system for diversion in the retention of the wire saw 100.

Figure 4A:
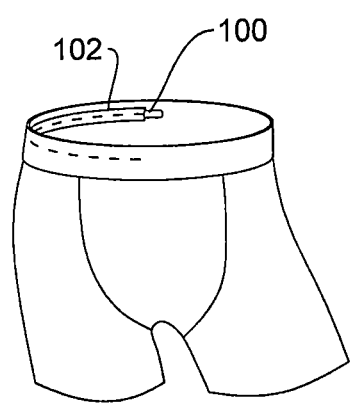
FIG. 4A is a front view of a briefs style undergarment incorporating system for diversion deployment of a survival saw according to a preferred embodiment of the inventive system.
Figure 4B:
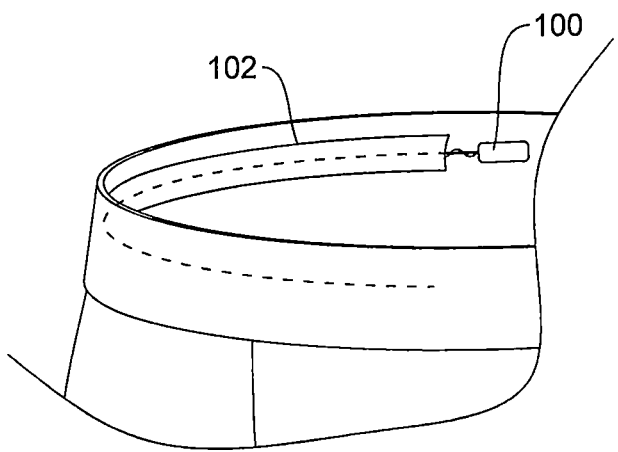
FIG. 4B is a partial detailed view of a deployment slot 102 formed within the seams of the briefs.

Referring to FIGS. 4A and 4B, a briefs style undergarment 210 is shown in combination with the wire saw 100. According to another aspect of the present invention the briefs style undergarment 210 may incorporate the deployment slot 102. In a more preferred aspect of the present invention, the deployment slot 102 is aligned with a seam 212, thereby making the slot 102 an imperceptible system for diversion in the retention of the wire saw 100.

Figure 5A:
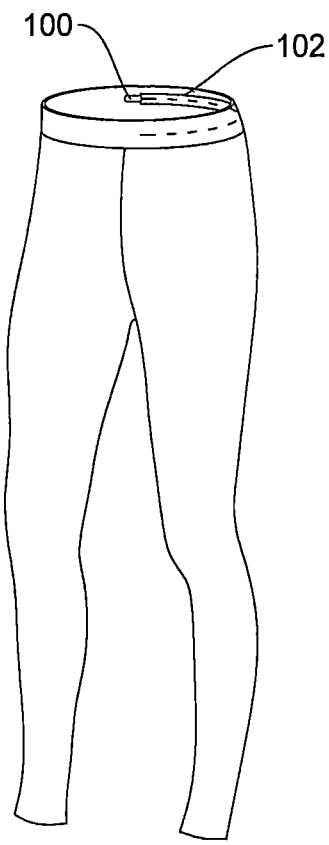
FIG. 5A is a front view of pants incorporating system for diversion deployment of a survival saw according to a preferred embodiment of the inventive system.
Figure 5B:
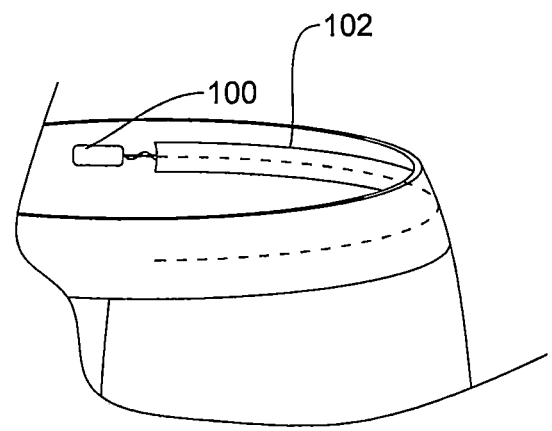
FIG. 5B is a partial detailed view of a deployment slot 102 formed within the seams of the pants.

Referring to FIGS. 5A and 5B, a pants style garment 220 is shown in combination with the wire saw 100. According to another aspect of the present invention the pants 220 may incorporate the deployment slot 102. In a more preferred aspect of the present invention, the deployment slot 102 is aligned with a seam 222, thereby making the slot 102 an imperceptible system for diversion in the retention of the wire saw 100.

Figure 6A:
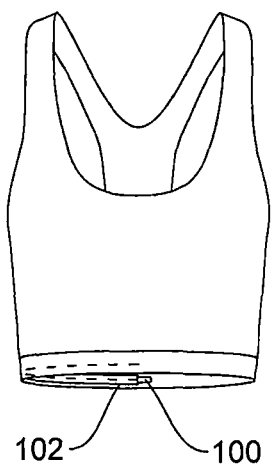
FIG. 6A is a front view of a camisole style undergarment shirt incorporating system for diversion deployment of a survival saw according to a preferred embodiment of the inventive system.
Figure 6B:
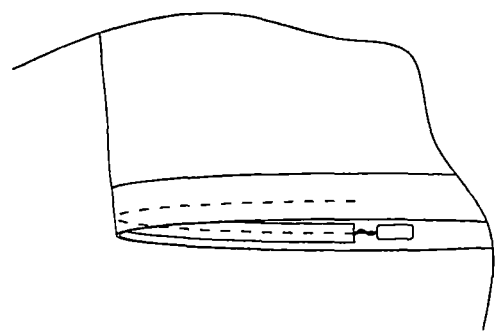
FIG. 6B is a partial detailed view of a deployment slot 102 formed within the seams of the camisole.

Referring to FIGS. 6A and 6B, a camisole style undergarment 230 is shown in combination with the wire saw 100. According to another aspect of the present invention the camisole style undergarment 230 may incorporate the deployment slot 102. In a more preferred aspect of the present invention, the deployment slot 102 is aligned with a seam 232, thereby making the slot 102 an imperceptible system for diversion in the retention of the wire saw 100.

Figure 7A:
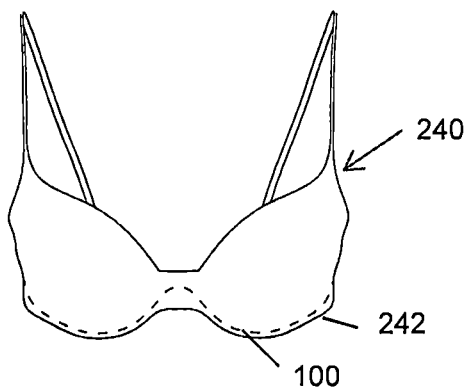
FIG. 7A is a front view of a brassier style undergarment incorporating system for diversion deployment of a survival saw according to a preferred embodiment of the inventive system.
Figure 7B:
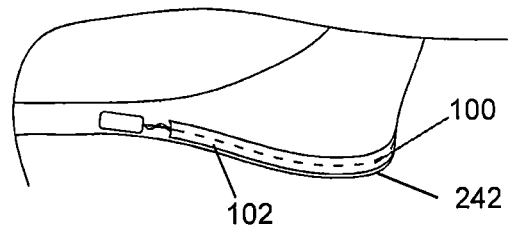
FIG. 7B is a partial detailed view of a deployment slot 102 formed within the seams of the brassier.

Referring to FIGS. 7A and 7B, a brassiere style undergarment 240 is shown in combination with the wire saw 100. According to another aspect of the present invention the brassiere style undergarment 240 may incorporate the deployment slot 102. In a more preferred aspect of the present invention, the deployment slot 102 is aligned with a seam 242, thereby making the slot 102 an imperceptible system for diversion in the retention of the wire saw 100.

Figure 8:
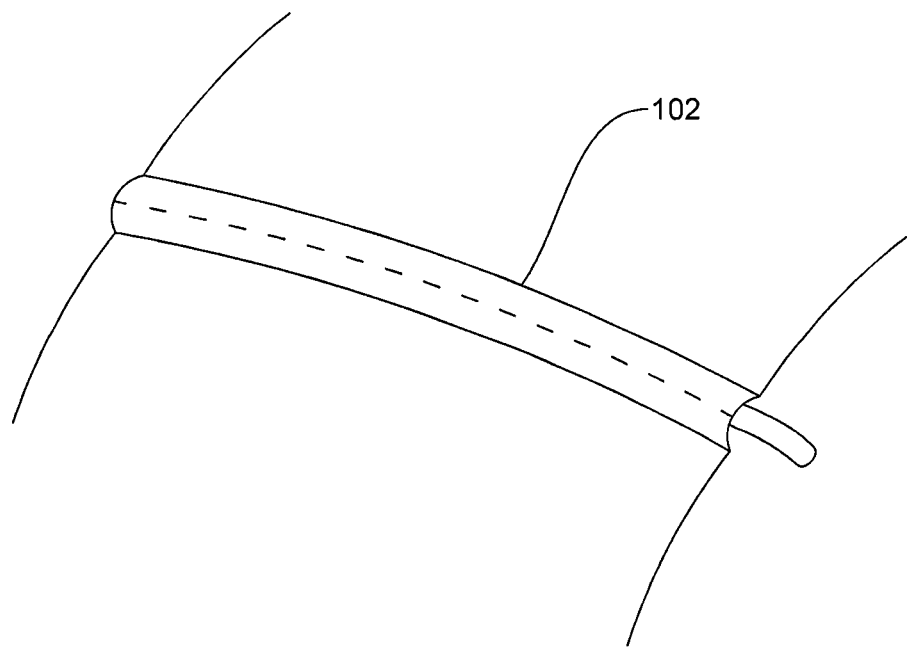
FIG. 8 is a detailed perspective view of the deployment slot 102 for use with the system for diversion deployment of a survival saw according to a preferred embodiment of the inventive system.
Figure 9:
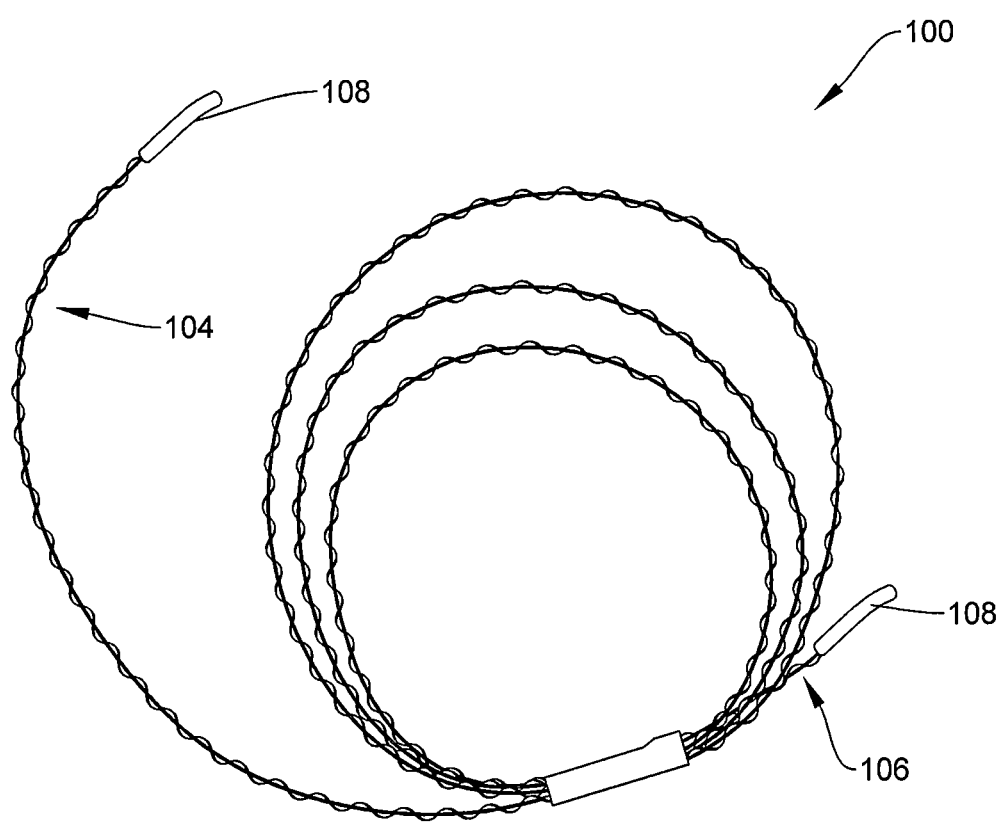
FIG. 9 is a detailed perspective view of a survival saw for use with the system for diversion deployment of a survival saw according to a preferred embodiment of the inventive system.
Figure 10:
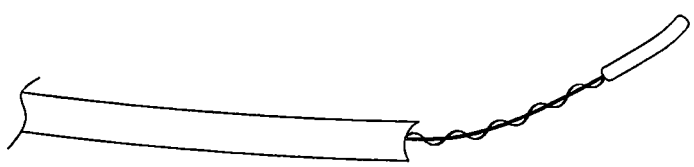
FIG. 10 is a perspective view showing the removal of the survival saw from the deployment slot according to the preferred embodiment of the present invention.

Referring in conjunction with FIG. 8 through FIG. 10 the survival saw 100 and slot 102 are shown in greater detail for use with a preferred embodiment of the inventive system. The survival saw 100 may be formed of a flexible, linearly elongated blade 104. On a preferred embodiment, the blade 104 may be thin enough to be difficult to detect when embedded within the slot 102. The wire saw 102 may be formed from corrosive-resistant metals, primarily stainless steel or titanium. Other non-corrosive metals may also be used, such as nickel, zinc, aluminum, brass, bronze, galvanized steel, copper, platinum, gold, or corten or weathered steel. Other non-metallic materials may also be used, as capable of providing the sufficient tensile strength and ability to provide a saw function. As an example, the size of wire blade 104 can be from about 20-gauge (about 0.81 mm) to about to 26-gauge (about 0.41 mm). However, it should be understood by those having ordinary skill in the relevant art, now in light of the present invention, that a size of the wire blade 104 is intended to be broadly construed as being thin to the degree that a casual observer, upon inspecting, would be deceived into mistaking the slot 102 and contained blade 104 as being an integrated part of the piece of clothes in a completely dissimulated manner. By way of example, a 26-gauge wire is ideal to be used as the actual stitching, while any size wire in the range can be hidden in the seams or hems of the article of clothing. Various sizes of wire saw will depend on what article of clothing they are to be concealed in. The heavier fabric of a military uniform can conceal a thicker, stronger wire saw, whereas undergarments can conceal thinner gauge wires.

At each terminal end 106 of the blade 104 may include a grasping element 108, preferably formed as a thin coating of a plastic material. In a more preferred embodiment, the grasping element 108 may be narrow enough so as to allow the saw 100 to be inserted in, or withdrawn from, the slot 102 without significant hindrance.

It should further be considered that the wire saw 100 may be of any other functional equivalent style or design that can accomplish the intended scope of the present disclosure, as broadly construed.

As shown in conjunction with FIG. 10, the removal of the survival saw 100 from the deployment slot 102 is shown according to the preferred embodiment of the present invention in which the saw 100 is undetectable, and fabricated into the infrastructure of clothing seams, with essential features being the hidden, imperceptible storage in the seams of the articles of clothing and/or military uniforms, thereby providing a soldiers with a stealth advantage in protecting themselves and/or escaping capture.

2. Operation of the Preferred Embodiment

Figure 11:
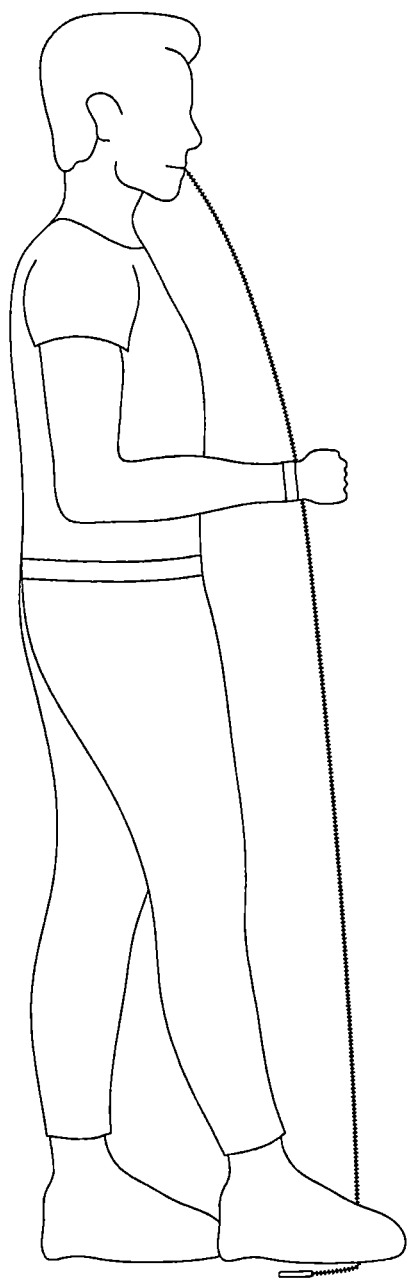
FIG. 11 is a perspective view showing the method of using the survival saw according to the preferred embodiment of the present invention.

Referring now in conjunction with FIG. 11, an exemplary method of using the survival saw 100 is shown in accordance with the preferred embodiment of the present invention. Intended for use by the military, and especially Special Forces as a tool of defense in situations where the soldier is captured by enemy combatants, the wire saw 100 blends in with the clothing or uniform threading. The saw 100 will thereby be undetectable while stored in the slot (not shown) that is fabricated into the infrastructure of clothing seams.

The saw 100 will thereby be on the soldier and accessible, even if constrained, with the various garment designs allowing for access by the user even with tied up hands in front or behind the body, and is deployable by being within the reach of the hands and allowing the captured to withdraw it, even with his hands tied.

Once deployed, the user may hold one end 106 with his or her teeth. Each end 106 having a thin plastic cover 108 provides a gripping structure, either at one end within the teeth or the other end being held by the user's foot. With the ends 106 grasped, the user may pull the blade 104 taut. The saw 100 may thereby be reciprocated to cut a rope or plastic zip tie restraints around their hands in order to remove such hand restraints. The saw 100 may be used for cutting plastics (zip ties), ropes, wood or even some kinds of light metals, and may also be used as a weapon.

The nature and intended use of this invention necessitates secrecy. Therefore, the slot 102 may be provided within the various types of garments without comment to a manufacturer of its function or use. Similarly, the saw 100 may be provided separately. The user may thereby combine the two in one or a number of apparel items prior to deployment, with the wire saw intended to be removable, and able to be added to any article of clothing by the soldier himself, when needed. The wire saw can be taken out and stored when soldiers are not in combat or on the front lines. This will help protect the secrecy of the invention, and also makes the wire saw accessible to add to any article of clothing, not just prefabricated items.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:
1. A method of using a survival saw comprising the steps:
   a. forming a deployment slot within an article of clothing aligned with a seam of the article of clothing and within the article of clothing;

b. storing the survival saw within the deployment slot in a manner that the survival saw is obfuscated from detection by visual inspection; and
c. deploying the survival saw by manually grasping the survival saw from the deployment slot by a user wearing the article of clothing;
d. holding a first end of the survival saw by grasping with the user's teeth;
e. holding a second end of the survival saw by grasping with a foot of the user;
f. pulling a flexible blade of the survival saw taut; and
g. reciprocating the flexible blade about a targeted object formed of plastic, ropes, wood or light metal.

2. The method of using a survival saw of claim 1, wherein the article of clothing in which the deployment slot is formed is selected from a group consisting of: a military uniform; a shirt; an undershirt; a briefs style undergarment; a pants style garment; a camisole style undergarment; and a brassiere style undergarment.

3. The method of using a survival saw of claim 1, wherein the survival saw comprises:

a linearly elongated blade formed of a corrosive-resistant material and having a first terminus and a second terminus opposite the first terminus;
a grasping element formed at or attached to each said first terminus and said second terminus;
said grasping elements being narrow enough so as to allow the saw to be inserted in, or withdrawn from, the deployment slot.

4. The method of using a survival saw of claim 3, wherein said grasping elements are formed as coating or over molded a plastic material narrow enough so as to allow insertion in or withdrawn from the deployment slot.

5. The method of using a survival saw of claim 3, wherein the corrosive-resistant material from which the linearly elongated blade is formed is selected from a group consisting of: stainless steel; titanium; nickel; zinc; aluminum; brass; bronze; galvanized steel; copper; platinum; gold; corten or weathered steel; and plastic.

6. The method of using a survival saw of claim 3, wherein the linearly elongated blade further comprises a wire from between 20-gauge to 26-gauge.

* * * * *